3,062,707
3-T-AMYL-6-CHLOROPHENYL N-METHYLCARBAMATE AND METHOD OF INHIBITING THE CHOLINESTERASE FUNCTION IN AGRICULTURAL PARASITES THEREWITH

Gustave K. Kohn, Berkeley, Joseph E. Moore, Pinole, and Joseph N. Ospenson, Concord, Calif., assignors to California Research Corporation, San Francisco, Calif., a corporation of Delaware
No Drawing. Filed June 29, 1959, Ser. No. 823,312
2 Claims. (Cl. 167—30)

This invention relates to a new compound; namely, 3-amyl-6-chlorophenyl N-methylcarbamate and its use as a cholinesterase inhibitor in agricultural pesticide formulations.

One of the ultimate criteria relating to the effectiveness of certain agricultural pesticides which function as contact and/or digestive toxicants is their ability to inhibit the cholinesterase enzyme system of the animal parasite. This type of functional activity is primarily responsible for the effectiveness of at least two of the recognized classes of synthetic organic pesticides; namely, the phosphates and carbamates. Recently, the pesticidal effectiveness of certain carbamic acid esters has been recognized, and efforts have been directed to the synthesis and development of specific carbamate esters of increased cholinergic activity.

There has now been discovered a unique compound, namely, 3-t-amyl-6-chlorophenyl N-methylcarbamate, whose anticholinesterase activity is markedly superior to some of the most active carbamate esters previously known. In fact, the cholinergic activity of the invention compound is of the order of five times greater than the activity of its analog; namely, m-t-butylphenyl N-methylcarbamate. This outstanding activity as a cholinesterase inhibitor accentuates its effectiveness as an agricultural pesticide and particularly its application as a contact and/or digestive toxicant for the purpose of inhibiting the cholinesterase function in the cold-blooded animal parasites such as insects, mites, nematodes, arachnids, etc.

The invention compound 3-t-amyl-6-chlorophenyl N-methylcarbamate, which is definitive of the following structural formula,

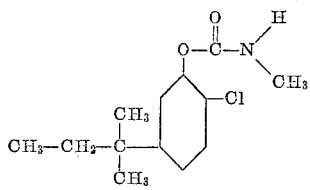

may be prepared (1) by reacting 3-t-amyl-6-chlorophenol with methylisocyanate or (2) by reacting 3-t-amyl-6-chlorophenol or the corresponding metal phenate with phosgene followed by reaction of the resulting intermediate chloroformate with methylamine.

Of particular significance to the production of the subject cholinesterase inhibitor is the particularity of the ester component of the carbamate.

While the 3-t-amyl-6-chlorophenyl radical is considered to be responsible for maximum cholinergic activity, the position of the chloro substituent is not necessarily restricted to the 6-position. Thus, the carbamate ester of the invention may be derived from a phenolic reactant which is obtained by the monochlorination of 3-t-amylphenol. For all practical purposes, the monochlorination of 3-t-amylphenol will result in a predominant yield of the 3-t-amyl-6-chlorophenol. The following examples represent a synthesis approach to the compound of the invention which substantially verifies the indicated and claimed structure of the compound. It will be understood that commercial practice may involve alternate and more abbreviated methods of preparation, as indicated above.

EXAMPLE I

Preparation of 3-t-Amyl-6-Chlorophenol 880 grams of p-t-amylchlorobenzene were added as rapidly as possible at 25–30° C. to a nitrating mixture containing 640 grams of 70% $HNO_3$ and 1080 grams of 96% $H_2SO_4$. After the addition was completed, an additional 179 grams of $H_2SO_4$ was added and the solution agitated for several hours. The crude nitrated mixture was then phase separated and the oil phase removed, neutralized and dried. A yield of 1017.5 grams of crude p-t-amylnitrochlorobenzene was obtained (92.9%).

1000 grams of the crude t-amylnitrochlorobenzene was added at a moderate rate to a 90–100° C. slurry of 270 ml. $H_2O$, 672 grams iron powder, 16.1 grams NaCl and 26.8 ml. of concentrated HCl. After all was added, the temperature was dropped to 80° C. and maintained at this level for 16 hours. The slurry was then cooled and filtered. The iron oxide precipitate was washed twice with benzene. The aqueous phase was then neutralized and extracted with benzene. The combined benzene extracts were dried, stripped and distilled. A yield of 673 grams (77.4%) of 3-t-amyl-6-chloroaniline was obtained at 110–116° C. at 0.1 mm.

Therefore, 50 grams of the aniline compound was dissolved in a solution of 127 ml. of $H_2O$ and 45 ml. of $H_2SO_4$ and then cooled to 0° C. A solution of 20.4 grams $NaNO_2$ in 55.6 ml. $H_2O$ was then added through a dropping funnel with good agitation. After all was added, an additional 190 ml. of $H_2O$ was added.

A separate flask containing 126.7 ml. of $H_2O$ plus 168.3 ml. concentrated $H_2SO_4$ was set up to permit steam distillation. This acid solution was heated to boiling and the foregoing cold diazonium solution was added slowly with simultaneous steam distillation. The organic phase was separated from the distillate and dried. A yield of 33 grams (67%) of the desired 3-t-amyl-6-chlorophenol was obtained.

In the application of the subject compound as a cholinesterase inhibitor, considerable variation in its formulation may be employed. Thus, 3-t-amyl-6-chlorophenyl N-methylcarbamate may be applied per se or in combination with other active ingredients in both solid or liquid pesticidal formulations. As an example, 3-t-amyl-6-chlorophenyl N-methylcarbamate may be formulated into a wettable powder by incorporating it with appropriate quantities of a solid inert carrier, such as talc, limestone, bentonite, diatomaceous earth, etc., and suitable wetting and emulsifying agents, such as the anionic and/or the nonionic surfactants. This mixture is thoroughly mixed and ground to a suitable particle size. For liquid formulations, the subject compound may be dissolved in hydrocarbon solvents or polar solvents or combinations thereof, depending upon the concentration desired, to which a minor quantity of an nonionic or anionic surfactant is added to provide emulsifying and wetting properties. Such liquid concentrates and wettable powders permit easy dispersion in water to practical field dilutions.

The outstanding cholinergic activity of the invention compound is demonstrated by the following standardized test procedure. The activity of the enzyme acetylcholinesterase involves a reaction function with the substrate acetylcholine resulting in the formation of choline and acetic acid. In this test, the enzyme activity is determined by the amount of acetic acid liberated and is measured in terms of the change in pH in the presence of a standard buffer solution over a definite time period.

The results are reported as the $I_{50}$ value which is defined as the quantity of inhibitor measured in micrograms per milliliter (gamma/ml.) which gives 50 percent inhibition.

For this test, acetylcholinesterase was obtained as a purified and stabilized enzyme from bovine erythrocytes; and the buffer employed contained 0.0367 mole sodium diethylbarbiturate, 1.20 moles potassium chloride, and 0.008 mole potassium dihydrogen phosphate per liter adjusted to a pH of 8.0. A stock solution of the candidate inhibitor containing 1 mg./ml. in methanol was prepared. Aliquots were then diluted with water to the test concentrations, which are usually between 0.01 and 10 gamma/ml. A series of concentrations are run concurrently. 1.0 ml. of the inhibitor solutions, adjusted to the test concentrations, is added to a 10 ml. beaker containing a magnetic flea. Simultaneously, a stop watch is started and 2.0 ml. of a standard enzyme plus buffer solution are added. The contents are agitated thoroughly and placed in a bath maintained at 25.0°±0.1° C. After exactly 30 minutes, there is added 0.1 ml. of a standard acetyl choline bromide solution which had been allowed to come to the bath temperature. Following thorough agitation, the covered beaker is returned to the constant temperature bath. At exactly 90 minutes, the pH is measured on a Beckman model G or equivalent pH meter.

The percent inhibition is then calculated from the pH values obtained for the blank, uninhibited enzyme, and the candidate inhibitor. A curve is then prepared by plotting on a semilogarithmic graph paper the concentration of the inhibitor in gamma/ml. on the log scale versus percent inhibition on the linear scale. The curve will be S shaped. The concentration where the curve crosses the 50 percent inhibition mark is the $I_{50}$ value.

The superior cholinergic activity or cholinesterase inhibition of 3-t-amyl-6-chlorophenyl N-methylcarbamate is attested by the following results in comparsion with its prior art analog, m-t-butylphenyl n-methylcarbamate and its unsubstituted homolog, m-t-amylphenyl N-methylcarbamate.

| Compound: | $I_{50}$ |
|---|---|
| m-t-Butylphenyl N-methylcarbamate | 0.11 |
| m-t-Amylphenyl N-methylcarbamate | 0.035 |
| 3-t-amyl-6-chlorophenyl N-methylcarbamate | 0.022 |

Obviously, many modifications and variations of the invention as hereinbefore set forth may be made without departing from the spirit and scope thereof, and therefore only such limitations should be imposed as are indicated in the appended claims.

We claim:
1. 3-t-amyl-6-chlorophenyl N-methylcarbamate.
2. A method of inhibiting the cholinesterase function in cold-blooded agricultural animal parasites which comprises contacting said parasites with an amount sufficient for cholinesterase inhibition of 3-t-amyl-6-chlorophenyl N-methylcarbamate.

References Cited in the file of this patent
UNITED STATES PATENTS

| 2,208,485 | Aeschlimann | July 16, 1940 |
| 2,362,508 | Stevens et al. | Nov. 14, 1944 |
| 2,677,698 | Deutschman et al. | May 4, 1954 |
| 2,776,197 | Gysin et al. | Jan. 1, 1957 |
| 2,843,519 | Fitch | July 15, 1958 |
| 2,854,374 | Huisman et al. | Sept. 30, 1958 |

OTHER REFERENCES

Kolbezen et al.: "Agricultural and Food Chemistry," vol. 2, pages 864–70 (1954).

UNITED STATES PATENT OFFICE

CERTIFICATE OF CORRECTION

Patent No. 3,062,707　　　　　　　　　　　November 6, 1962

Gustave K. Kohn et al.

It is hereby certified that error appears in the above numbered patent requiring correction and that the said Letters Patent should read as corrected below.

Column 1, line 13, for "3-amyl-6-chlorophenyl" read -- 3-t-amyl-6-chlorophenyl --.

Signed and sealed this 7th day of May 1963.

(SEAL)
Attest:

ERNEST W. SWIDER
Attesting Officer

DAVID L. LADD
Commissioner of Patents